(12) United States Patent
Kang

(10) Patent No.: US 7,549,620 B2
(45) Date of Patent: Jun. 23, 2009

(54) ENGINE MOUNT INSULATOR FOR VEHICLE

(75) Inventor: Kyung Wan Kang, Iksan-si (KR)

(73) Assignee: Hyundai Motor Company, Seoul (KR)

( * ) Notice: Subject to any disclaimer, the term of this patent is extended or adjusted under 35 U.S.C. 154(b) by 94 days.

(21) Appl. No.: 11/300,398

(22) Filed: Dec. 13, 2005

(65) Prior Publication Data

US 2006/0131798 A1    Jun. 22, 2006

(30) Foreign Application Priority Data

Dec. 21, 2004    (KR) .................... 10-2004-0109572

(51) Int. Cl.
*F16F 7/00*    (2006.01)
*F16F 15/00*    (2006.01)

(52) U.S. Cl. ............... 267/141; 267/140.3; 267/140.11; 267/141.1; 267/153; 267/292; 188/300; 280/299

(58) Field of Classification Search ............. 267/141.1, 267/292, 153, 141.3, 141.4, 141.7, 140.11; 188/300; 280/299

See application file for complete search history.

(56) References Cited

U.S. PATENT DOCUMENTS

| | | | | |
|---|---|---|---|---|
| 2,767,977 A | * | 10/1956 | Paton | 267/30 |
| 3,565,373 A | * | 2/1971 | Frye | 267/140.3 |
| 4,930,758 A | * | 6/1990 | Poirier | 267/292 |
| 4,987,679 A | * | 1/1991 | Rau | 29/897.2 |
| 5,242,146 A | * | 9/1993 | Tecco et al. | 248/638 |
| 5,263,815 A | * | 11/1993 | Brenner | 267/219 |
| 6,361,030 B1 | * | 3/2002 | Rogge et al. | 267/140.13 |
| 6,511,059 B2 | * | 1/2003 | Seynaeve | 267/140.13 |

FOREIGN PATENT DOCUMENTS

JP    2003-194141    7/2003

* cited by examiner

*Primary Examiner*—Robert A Siconolfi
*Assistant Examiner*—Mahbubur Rashid
(74) *Attorney, Agent, or Firm*—Morgan, Lewis & Bockius LLP

(57) ABSTRACT

An engine mount insulator is interposed between a chassis frame and an engine, and includes a lower housing including flanges fixed to a lateral side of the chassis frame by means of a bolt, and a reverse-V shaped plate provided between the flanges and extending toward the engine; an upper housing including a body, a predetermined portion of which is fixed to one side of the engine by means of a bolt, and wings having a reverse-V shape and extending downward from both sides of the body; a rubber member having a rectangular shape and including a first side assembled with an inner surface of the wings of the upper housing, and a second side assembled with the lower housing; and a side plate assembled with the upper housing by means of a bolt so as to support the rubber member from a lower portion of the rubber member.

14 Claims, 7 Drawing Sheets

ENGINE MOUNT INSULATOR FOR VEHICLE

CROSS-REFERENCE TO RELATED APPLICATION

This application claims priority to, and the benefit of, Korean Patent Application 10-2004-0109572, filed in the Korean Intellectual Property Office on Dec. 21, 2004, the entire contents of which are incorporated herein by reference.

BACKGROUND OF THE INVENTION

1. Field of the Invention

The present invention relates to an engine mount insulator for a large-sized truck. More particularly, the present invention relates to an engine mount insulator for a large-sized truck capable of preventing vibration from being applied thereto in longitudinal, transverse and forward/reverse directions.

2. Description of the Prior Art

In general, as shown in FIG. 12, an engine mount insulator used for a truck is mounted in a chassis frame while being inclined by a predetermined angle in order to prevent vibration of an engine from being applied thereto.

The engine mount insulator 10 includes a chassis plate 11 fixed to a chassis frame, an engine plate 12 fixed to one side of the engine, and a rubber member 13 interposed between the chassis plate 11 and the engine plate 12.

Stoppers 11a, 11b, 12a and 12b are provided at both sides of the chassis plate 11 and the engine plate 12. The stoppers 11a, 11b, 12a and 12b are bent inward such that the rubber member 13 is surrounded by the stoppers 11a, 11b, 12a and 12b. A predetermined gap is formed between opposite stoppers 11a and 12a and 11b and 12b, respectively.

The chassis plate 11 and the engine plate 12 are inclined by an angle of about 30 to 50°. A bolt 15 is provided in the chassis plate 11 and the engine plate 12 in order to assemble the chassis plate 11 and the engine plate 12 with the chassis frame and one side of the engine, respectively. In a case of the engine plate 12, the bolt 15 is uprightly aligned by means of a separate bracket 14 in order to improve assembling work between the engine plate 12 and the engine.

However, according to the conventional engine mount insulator, the engine plate and the chassis plate, which are inclined while surrounding the rubber member, are fabricated through pressing work, so that the engine plate and the chassis plate have heavy weights and can be easily broken when external impact is applied thereto. In addition, since the stoppers are provided at upper and lower portions of the engine plate and the chassis plate, the stoppers may insufficiently control the movement of the engine in the left and right directions so that vibration of the engine is transferred to the rubber member in the left and right directions, shortening the life span of the rubber member.

In particular, in a case of the above box-type engine mount insulator, vibration between the engine and the chassis frame may be restricted only in two directions thereof so that the vibration cannot be sufficiently dampened between the engine and the chassis frame.

SUMMARY OF THE INVENTION

Accordingly, the present invention has been made to solve one or more of the above-mentioned problems occurring in the prior art, and an object of the claimed invention is to provide an engine mount insulator for a large-sized truck capable of preventing vibration from being applied thereto in longitudinal, transverse and forward/reverse directions.

In order to accomplish the above object, the present invention provides an engine mount insulator for a large-sized truck interposed between a chassis frame and an engine to dampen vibration between the chassis frame and the engine, the engine mount insulator comprising: a lower housing including flanges fixed to a lateral side of the chassis frame by means of a bolt and a reverse-V shaped plate provided between the flanges and extending toward the engine; an upper housing including a body, a predetermined portion of which is fixed to one side of the engine by means of a bolt, and wings having a reverse-V shape and extending downward from both sides of the body; a rubber member having a rectangular shape and including a first side assembled with an inner surface of the wings of the upper housing and a second side assembled with the lower housing; and a side plate assembled with the upper housing by means of a bolt so as to support the rubber member from a lower portion of the rubber member.

BRIEF DESCRIPTION OF THE DRAWINGS

The above and other features and advantages of the claimed invention will be more apparent from the following detailed description taken in conjunction with the accompanying drawings.

DETAILED DESCRIPTION OF THE PREFERRED EMBODIMENTS

Figure 1:
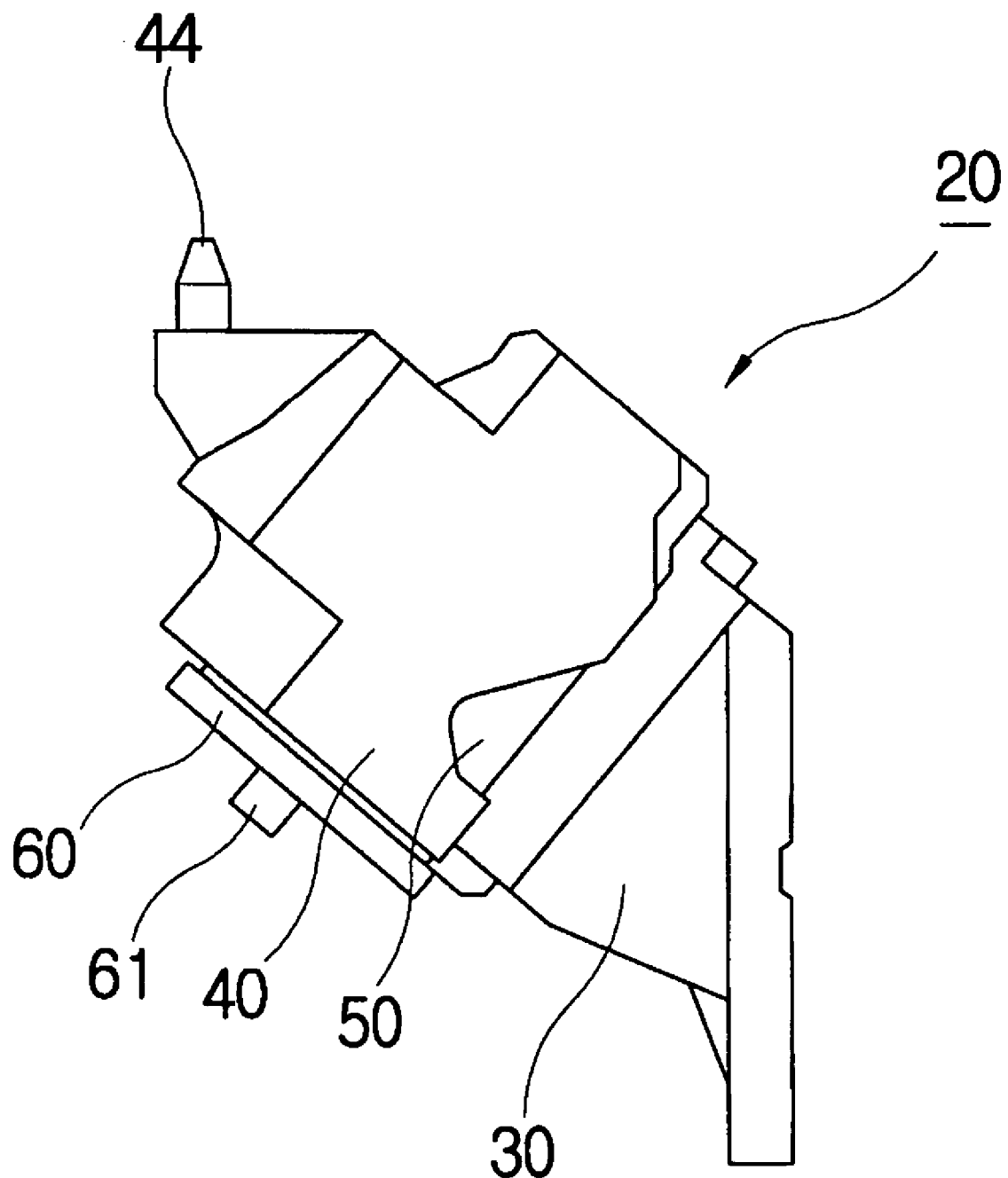
FIG. 1 is an assembled view illustrating an engine mount insulator according to one embodiment of the present invention.
Figure 2:
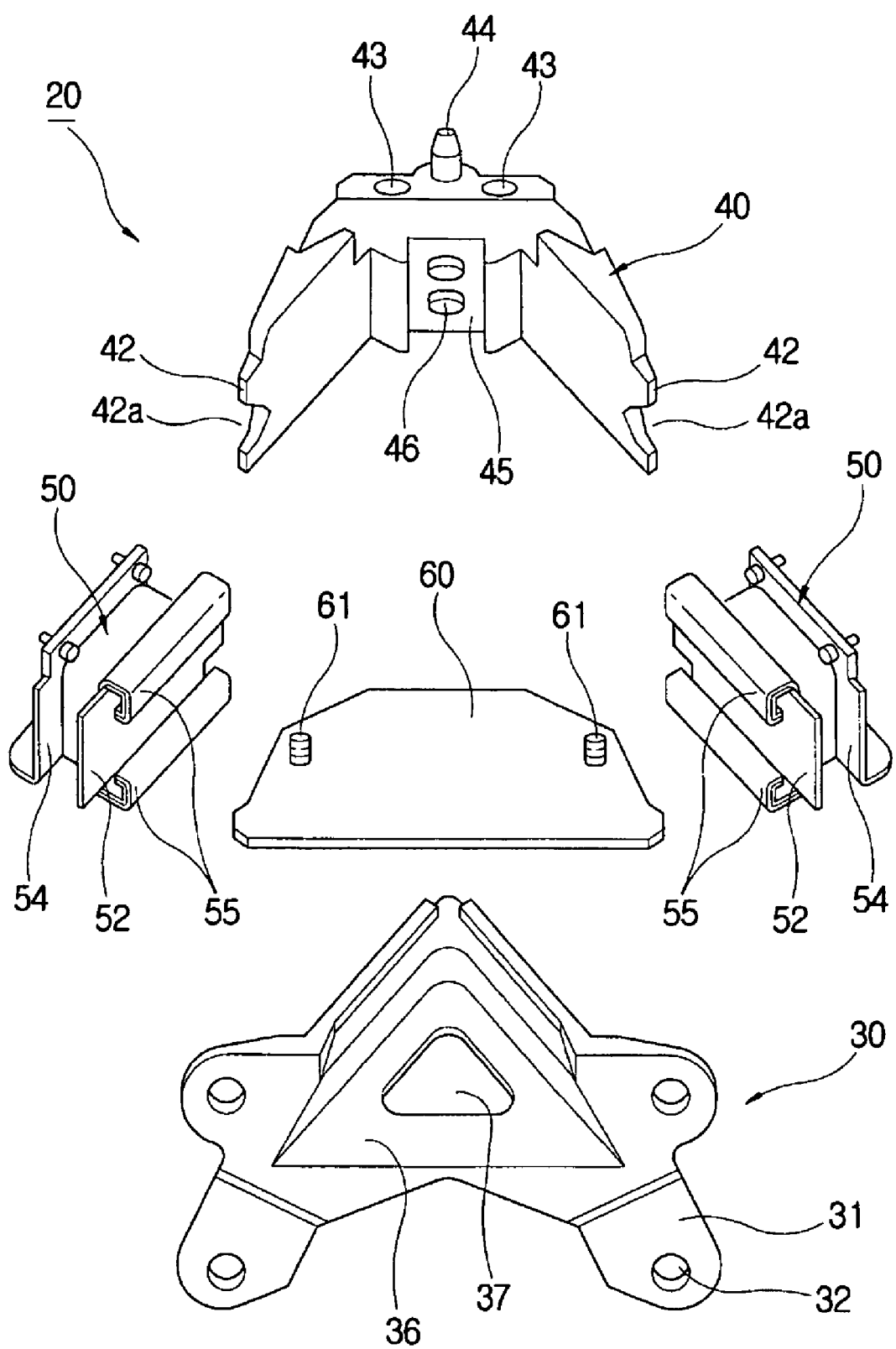
FIG. 2 is an exploded perspective view illustrating an engine mount insulator according to one embodiment of the present invention.
Figure 3:
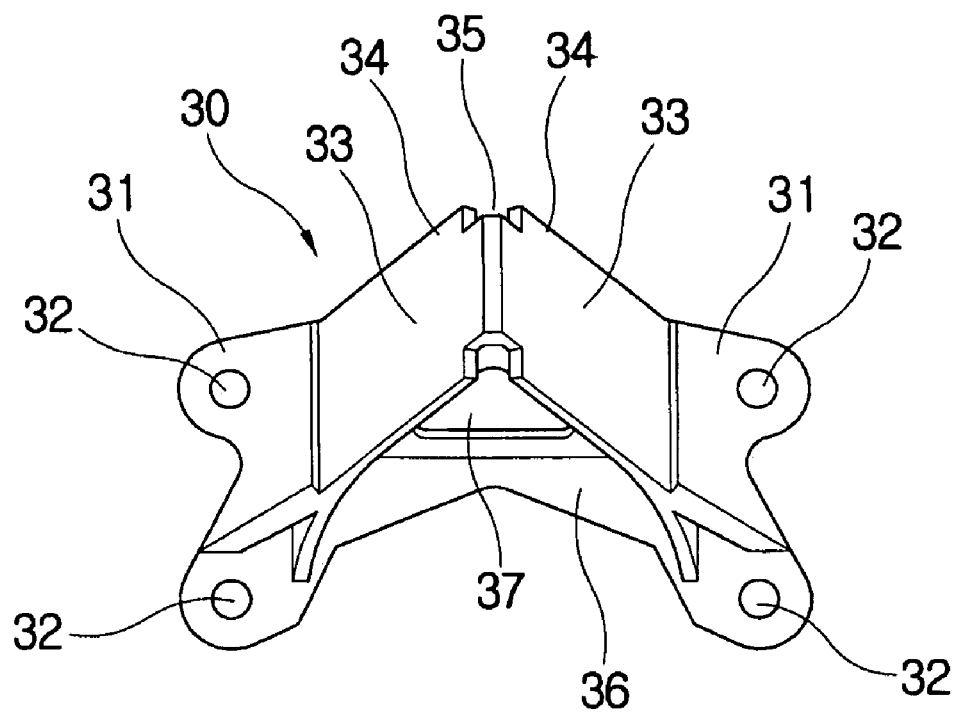
FIG. 3 is a front view illustrating a lower housing according to one embodiment of the present invention.
Figure 4:
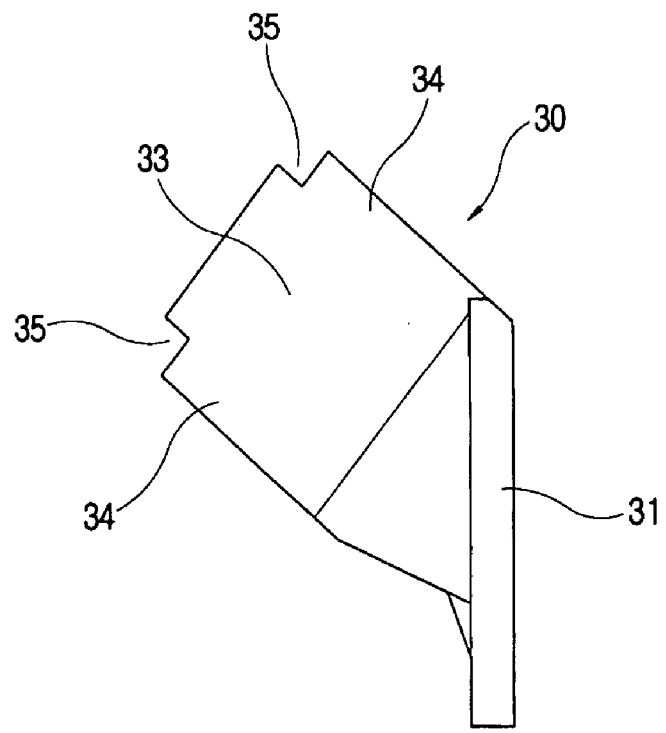
FIG. 4 is a side view illustrating a lower housing according to one embodiment of the present invention.
Figure 5:
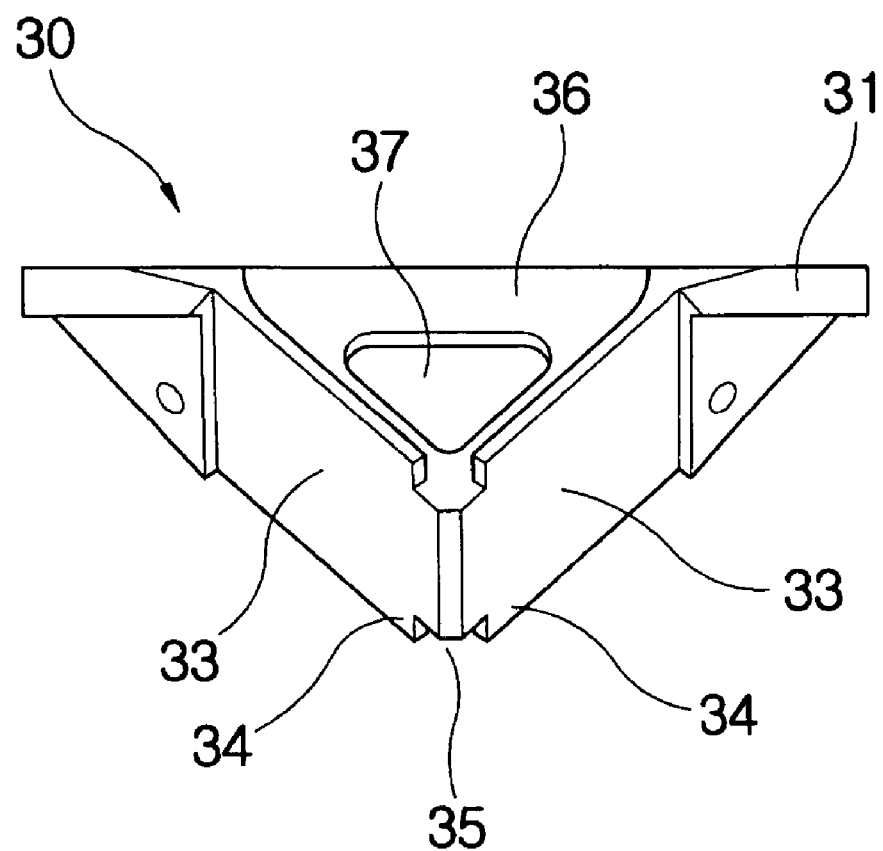
FIG. 5 is a plan view illustrating a lower housing according to one embodiment of the present invention.
Figure 6:
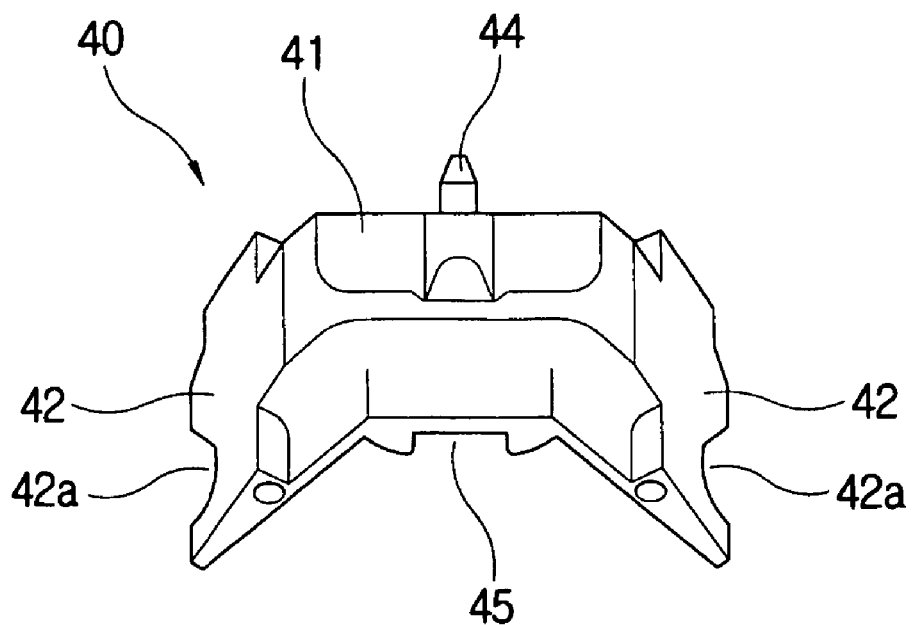
FIG. 6 is a front view illustrating an upper housing according to one embodiment of the present invention.
Figure 7:
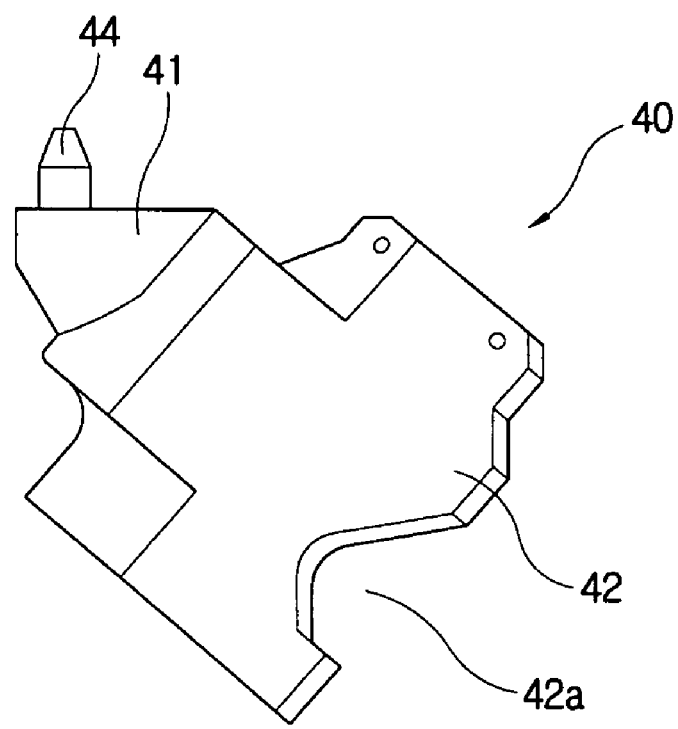
FIG. 7 is a side view illustrating an upper housing according to one embodiment of the present invention.
Figure 8:
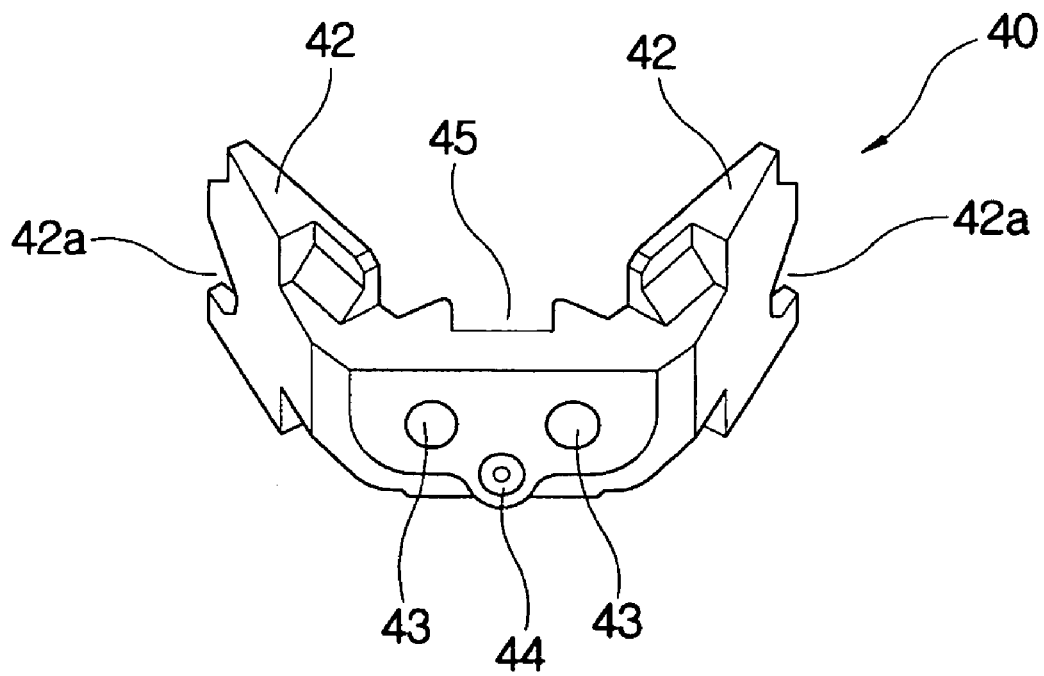
FIG. 8 is a plan view illustrating an upper housing according to one embodiment of the present invention.

Hereinafter, embodiments of the present invention will be described with reference to the accompanying drawings. In the following description and drawings, the same reference numerals are used to designate the same or similar components, so repetition of the description on the same or similar components will be omitted.

Reference numeral 20 represents an engine mount insulator according to the present invention. The engine mount insulator 20 is provided for the purpose of vibration-insulation between an engine and a chassis frame when the engine of a large-sized truck has been mounted in the chassis frame.

As described above, the engine mount insulator 20 prevents vibration of the engine or a chassis from being applied thereto in longitudinal, transverse and forward/reverse directions while the engine operates or the vehicle travels.

To this end, the engine mount insulator 20 includes a lower housing 30 mounted in the chassis frame, an upper housing 40 mounted in a lower portion or a side portion of the engine, rubber members 50 interposed between the lower and upper housings 30 and 40 in order to prevent vibration of the engine or the chassis from being transferred to the lower and upper housings 30 and 40, and a side plate 60 assembled with the upper housing 40 through a bolt 61 so as to support the rubber members 50 from lower portions of the rubber members 50.

First, the structure of the lower housing 30 will be described below. The lower housing 30 includes flanges 31 fixed to a side of the chassis frame by means of a bolt and a reverse-V shaped plate 33 provided between the flanges 31 and extending toward the engine. The flanges 31 have bolt holes 32 into which bolts are screw-coupled in order to assemble the flanges 31 with the chassis frame.

In addition, rubber assembling guides 34 are provided at both lateral sides of the reverse-V shaped plate 33 of the lower housing 30, for assembling the rubber members 50 with the lower housing 30. Both side edge parts of contact portions between the rubber assembling guides 34 are partially cut away so that mounting cavities 35 are formed at the side edge parts of the contact portions between the rubber assembling guides 34. A center rib 36 is formed between middle portions of opposite inner surfaces of the reverse-V shaped plate 33 of the lower housing 30. A predetermined portion of the center rib 36 is cut away in a triangular pattern such that a triangular hole 37 is formed in the center rib 36, reducing the weight of the lower housing 30.

The upper housing 40 has a body 41, and a predetermined portion of the body 41 is fixed to one side of the engine by means of a bolt. In addition, the upper housing 40 includes wings 42 having a reverse-V shape and extending downward from both sides of the body 41. In order to fix the upper housing 40 to the lower portion or the side portion of the engine by using a bolt, a bolt hole 43 is formed at an upper surface of the body 41 of the upper housing 40. A fixing pin 44 having a predetermined size protrudes from the body 41 for stably mounting the engine in the process of engine mounting work. An upper portion of the fixing pin 44 is preferably tapered such that the fixing pin 44 can be easily inserted into a hole formed in the engine.

In addition, a slot 45 having a predetermined size is formed lengthwise along an inner surface of the body 41 of the upper housing 40. At least one stopper 46 having a nail structure is inserted into the body 41 of the upper housing 40 from the inner surface, on which the slot 45 is located. The nail structure includes a head part and a body part, the head part being larger in cross-section than the body part. The head part of the stopper 46 protrudes from the inner surface by a predetermined length. The number of stoppers 46 may vary from one engine to another.

Furthermore, cut parts 42a are provided at end portions of the wings 42 of the upper housing 40 such that the rubber members 50 are partially exposed to the exterior when the rubber members 50 are mounted in the upper housing 40.

Each rubber member 50, interposed between the lower housing 30 and the upper housing 40, has a body 51 made from rubber. In addition, an inner steel plate 52 and an outer steel plate 54 are provided at both sides of each rubber member 50, such that they can be coupled with the upper and lower housings 30 and 40.

In particular, assembling rails 55 having a bent section are provided at both upper and lower ends of the inner steel plate 52 so as to improve assembling work between the lower housing 30 and the rubber assembling guides 34. That is, in a state in which one side of the assembling rail 55 is coupled with the rubber assembling guide 34 through the mounting cavity 35 formed in the lower housing 30, the inner steel plate 52 slidably moves so as to completely couple the assembling rail 55 with the rubber assembling guide 34.

In order to form the assembling rails 55, both upper and lower ends of the inner steel plate 52 are bent toward the inside, thereby forming bent-shaped steel rails 55a. In addition, rubber rails 55b having a bent section are provided in the inner portion of the body 51 of the rubber member 50 such that the rubber rails 55b can surround the steel rails 55a. That is, the inner steel plate 52 is insert-molded with the rubber member 50 in a state in which the steel rails 55a are inserted into the rubber rails 55b, and the assembling rails 55 consisting of the steel rails 55a and the rubber rails 55b are coupled with the rubber assembling guides 34 of the lower housing 30 so that the lower housing 30 can be securely coupled with the rubber member 50.

Figure 9:
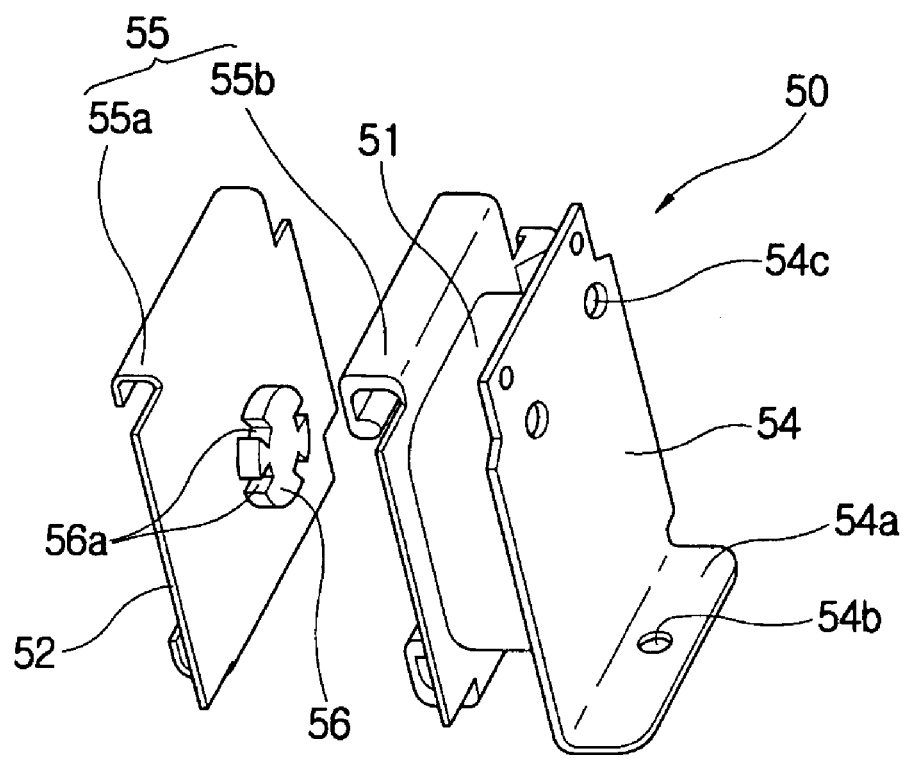
FIG. 9 is an exploded perspective view illustrating a rubber member according to one embodiment of the present invention.
Figure 10:
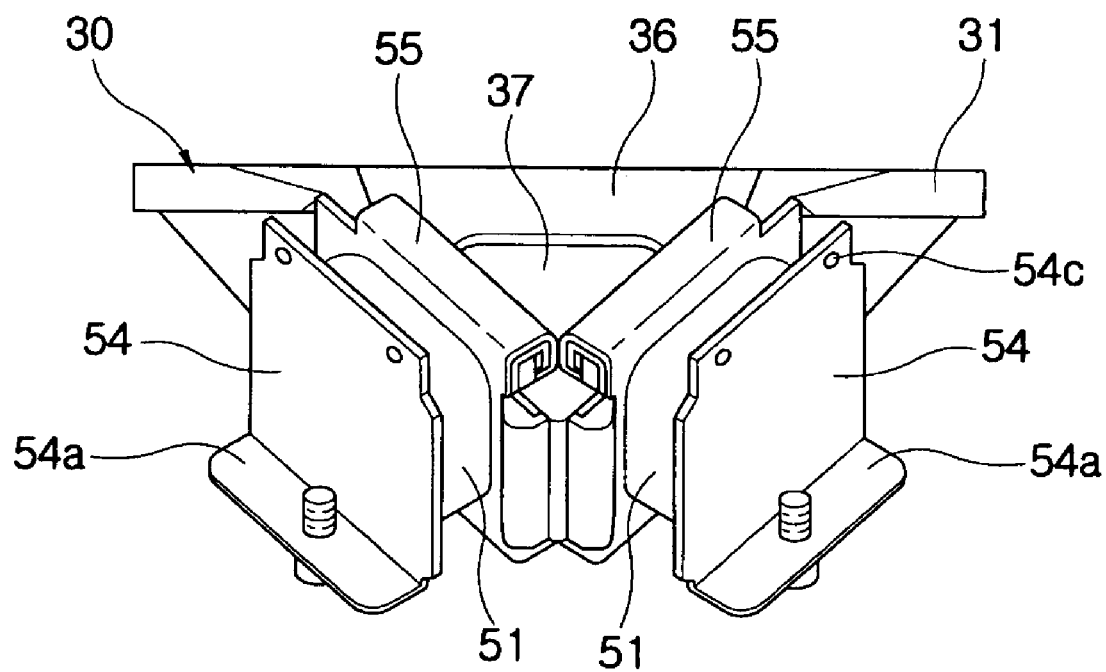
FIG. 10 is a perspective view illustrating an assembled state of an engine mount insulator according to one embodiment of the present invention.
Figure 11:
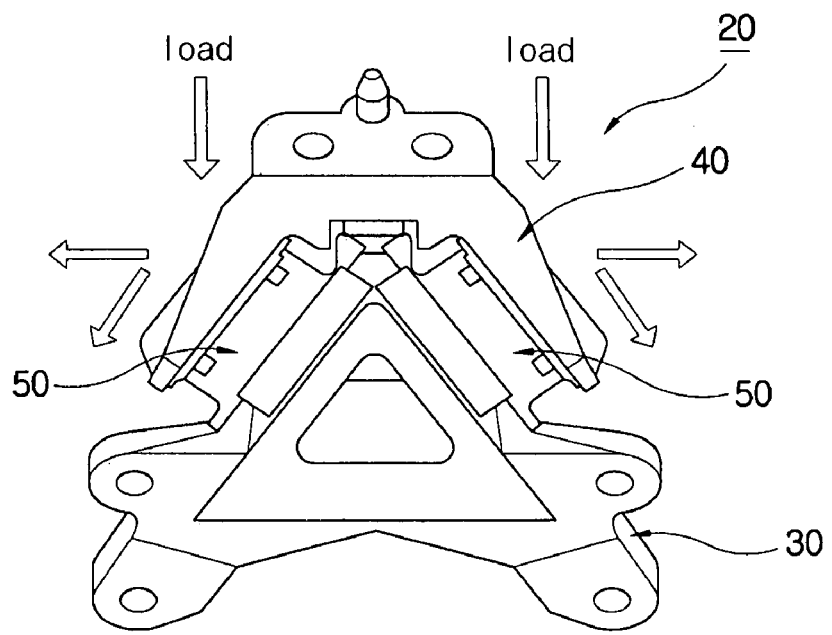
FIG. 11 is a perspective view illustrating distribution of the load applied to an engine mount insulator according to one embodiment of the present invention.
Figure 12:
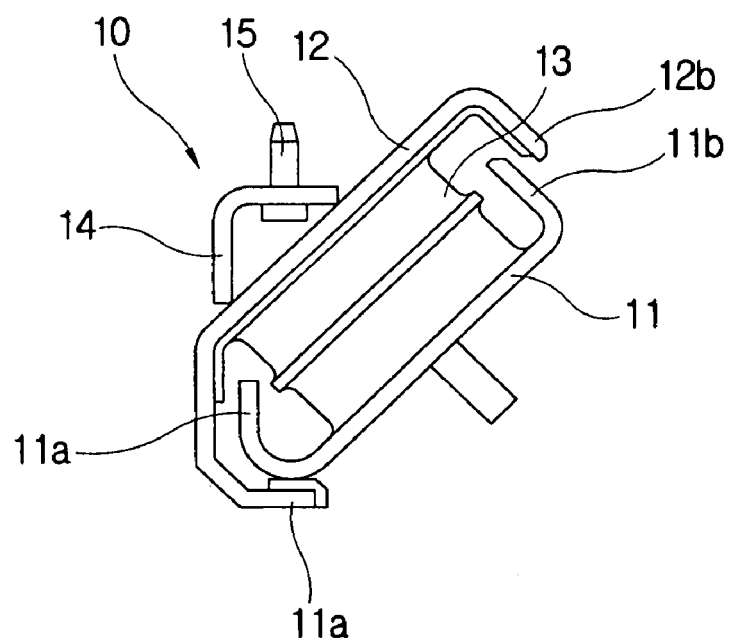
FIG. 12 is a view illustrating a conventional engine mount insulator.

In the meantime, a spacer 56 is interposed between the body 51 of the rubber member 50 and an inner surface of the inner steel plate 52, in order to form a predetermined gap between the body 51 of the rubber member 50 and the inner surface of the inner steel plate 52. Similar to the inner steel plate 52, the spacer 56 is made from metal and is fixed to the inner steel plate 52 by means of welding, riveting, bolting etc. Thus, the inner steel plate 52 can be fixedly secured to the rubber member 50 even if the insert molding process between the inner steel plate 52 and the rubber member 50 has been finished. As shown in FIG. 9, the spacer 56 has a substantially cylindrical shape, i.e. is substantially symmetrical in the plane of the inner steel plate 52, and is positioned at the center of the plate 52. The spacer 56 may have slots 56a at an outer peripheral portion thereof.

The outer steel plate 54 is provided at the lower end portion thereof with a bending part 54a, which bents at a right angle so as to allow the outer steel plate 54 to be easily assembled with the side plate 60. In addition, a bolt hole 54b is formed in the bending part 54a and a bolt is screw-coupled into the bolt hole 54b in order to maintain the assembling state between the outer steel plate with the side plate 60.

In addition, a bolt hole 54c is formed at an upper end portion of the outer steel plate 54 so as to assemble the outer steel plate 54 with the wings 42 of the upper housing 40.

Hereinafter, the mounting state and the operation of the engine mount insulator having the above structure will be described.

The engine mount insulator including a plurality of components must be assembled before the engine has been mounted on the chassis frame. The assembling process for the engine mount insulator including a plurality of components is performed separately from the engine mounting process in the process of fabricating the engine mount insulator.

First, the inner steel plate 52 and the outer steel plate 54, provided at both sides of the rubber member 50, are preferably insert-molded with the rubber member 50. However, it is also possible to assemble the inner steel plate 52 and the outer steel plate 54 with the body of the rubber member 50 after separately fabricating the inner steel plate 52 and the outer steel plate 54.

After that, in a state in which the assembling rail 55 of the rubber member 50 having the above structure is aligned corresponding to the rubber assembling guide 34 through the mounting cavity 35 formed in the lower housing 30, the rubber member 50 slidably moves so as to completely couple the assembling rail 55 with the rubber assembling guide 34.

In addition, in a state in which the surface of the outer steel plate 54 makes surface-contact with the inner surface of the wings 42 of the upper housing 40, and the bending part 54a of the outer steel plate 54 makes surface-contact with the lower surface of the wings 42, the bolt is screw-coupled into the bolt hole 54b formed in the bending part 54a. At this time, the side plate 60 is positioned at a lower portion of the bending part 54a making contact with the lower surface of the wings 42 of the upper housing 40 in such a manner that the rubber members 50 are supported by means of the side plate 60. In addition, in order to prevent the rubber members 50 from directly making contact with the body 41 of the upper housing 40, the stopper 46 is installed in the slot 45 of the body 41.

As described, when the engine is mounted in the chassis frame by using the engine mount insulator 20 including the rubber members 50, the lower housing 30, the upper housing 40, and the side plate 60, the fixing pin 44 providing from the upper surface of the body of the upper housing 40 is inserted into a predetermined portion of the engine and the bolt is screw-coupled into the bolt hole 43 formed in the body 41 of the upper housing 40 to assemble the engine mount insulator 20 with the engine.

In addition, in a state in which the inner surface of the lower housing 30 is aligned corresponding to the lateral side of the chassis frame, the bolt is screw-coupled into the bolt hole 32 formed in the flanges 31 of the lower housing 30 so that the engine mount insulator 20 is assembled with the chassis frame.

Therefore, the load applied to the rubber members 50 may be distributed in the vector direction by means of the engine mount insulator 20 interposed between the engine and the chassis frame. Thus, as compared with the conventional engine mount insulator for the large-sized truck, the engine mount insulator according to the present invention can effectively distribute the load applied to the rubber members 50. Accordingly, vibration noise derived from vibration of the engine or the chassis frame can be effectively dampened. In particular, in the case of the engine mount insulator 20, the rubber members 50 can dampen the load applied thereto in the longitudinal, transverse and forward/reverse directions, thereby providing occupants in the vehicle with superior ride comport.

As described above, according to the present invention, the lower housing and the upper housing of the engine mount insulator, which is interposed between the engine and the chassis frame so as to mount the engine in the chassis frame, have the reverse-V shaped structure in order to support the rubber members, so that vibration applied to the engine mount insulator from the engine or the chassis frame in the longitudinal, transverse and forward/reverse directions can be effectively dampened. Since vibration applied to the engine mount insulator from the engine or the chassis frame can be significantly reduced, noise is also significantly reduced, providing occupants in the vehicle with superior ride comport.

Although an embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An engine mount insulator for a large-sized truck interposed between a chassis frame and an engine to dampen vibration between the chassis frame and the engine, the engine mount insulator comprising:

a lower housing including flanges fixed to a lateral side of the chassis frame by means of a bolt and a reverse-V shaped plate provided between the flanges and extending toward the engine, wherein rubber assembling guides are formed at both lateral sides of the reverse-V shaped plate of the lower housing, and both side edge parts of contact portions between the rubber assembling guides are partially cut away so that mounting cavities are formed at the side edge parts of the contact portions between the rubber assembling guides;

an upper housing including a body, a predetermined portion of the body being fixed to one side of the engine by means of a bolt; the upper housing further including wings having a reverse-V shape and extending downward from both sides of the body;

a rubber member having a rectangular shape and including a first side assembled with an inner surface of the wings of the upper housing, and a second side assembled with the lower housing; and a side plate assembled with the upper housing by means of a bolt so as to support the rubber member from a lower portion of the rubber member.

2. The engine mount insulator as claimed in claim 1, wherein an outer steel plate is provided at an outer surface of the rubber member in order to improve assembling work for the rubber member with respect to the upper housing, and an inner steel plate is provided at an inner surface of the rubber member in order to assemble the rubber member with the lower housing.

3. The engine mount insulator as claimed in claim 1 or 2, wherein rubber assembling guides are provided at both lateral sides of the reverse-V shaped plate of the lower housing for assembling the rubber members with the lower housing, and assembling rails having a bent sections and being coupled with the rubber assembling guides are provided in the rubber member.

4. The engine mount insulator as claimed in claim 3, wherein, in order to form the assembling rails, both upper and lower ends of the inner steel plate are bent toward the inside, thereby forming bent-shaped steel rails, and rubber rails having a bent section are provided in an inner portion of a body of the rubber member such that the rubber rails surround the steel rails.

5. The engine mount insulator as claimed in claim 2, wherein a spacer having a predetermined thickness is interposed between a body of the rubber member and an inner surface of the inner steel plate in order to form a predetermined gap between the body of the rubber member and the inner surface of the inner steel plate.

6. The engine mount insulator as claimed in claim 5, wherein the spacer has a substantially cylindrical shape and is integrally formed with a center portion of the inner steel plate.

7. The engine mount insulator as claimed in claim 6, wherein the spacer has a plurality of slots at an outer peripheral portion thereof.

8. The engine mount insulator as claimed in claim 2, wherein the outer steel plate is provided at a lower end portion thereof with a bending part, which bends at a predetermined angle so as to allow the outer steel plate to be easily assembled with the side plate, and a bolt hole is formed in the bending part.

9. The engine mount insulator as claimed in claim 2, wherein a bolt hole is formed at an upper end portion of the outer steel plate so as to assemble the outer steel plate with the wings of the upper housing.

10. The engine mount insulator as claimed in claim 1, wherein a fixing pin having a predetermined size protrudes from the body of the upper housing for stably mounting the engine in a process of engine mounting work.

11. The engine mount insulator as claimed in claim 10, wherein an upper portion of the fixing pin is tapered.

12. The engine mount insulator as claimed in claim 1, wherein a slot having a predetermined size is formed lengthwise along an inner surface of the body of the upper housing, at least one stopper is inserted into the body of the upper housing from the inner surface, and a head part of the stopper protrudes from the inner surface by a predetermined length.

13. The engine mount insulator as claimed in claim 1, wherein cut parts are provided at end portions of the wings of the upper housing such that the rubber member is partially exposed to an exterior when the rubber member is mounted in the upper housing.

14. The engine mount insulator as claimed in claim 1, wherein a center rib is formed between middle portions of opposite inner surfaces of the reverse-V shaped plate of the lower housing, and a predetermined portion of the center rib is cut away such that a triangular hole is formed in the center rib.

* * * * *